(12) United States Patent
Hanya et al.

(10) Patent No.: US 7,835,114 B2
(45) Date of Patent: Nov. 16, 2010

(54) DISC DRIVE APPARATUS

(75) Inventors: Masao Hanya, Yokohama (JP); Tatsuhiko Nishida, Yokohama (JP); Jun Soga, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 698 days.

(21) Appl. No.: 11/825,075

(22) Filed: Jul. 2, 2007

(65) Prior Publication Data

US 2008/0007873 A1 Jan. 10, 2008

(30) Foreign Application Priority Data

Jul. 5, 2006 (JP) .............................. 2006-185828

(51) Int. Cl.
*G11B 21/21* (2006.01)
(52) U.S. Cl. .................................. 360/265.7
(58) Field of Classification Search ............... 360/265.7
See application file for complete search history.

(56) References Cited

U.S. PATENT DOCUMENTS

| 6,034,834 | A | 3/2000 | Yoshikawa et al. | |
|---|---|---|---|---|
| 6,532,137 | B2 | 3/2003 | Huang et al. | |
| 6,556,382 | B1 * | 4/2003 | Tangren | 360/244.8 |
| 7,064,932 | B1 * | 6/2006 | Lin et al. | 360/265.9 |
| 7,239,486 | B2 * | 7/2007 | Johnson et al. | 360/264.7 |

FOREIGN PATENT DOCUMENTS

| JP | 58-128057 A | 7/1983 |
|---|---|---|
| JP | 62-159809 A | 7/1987 |
| JP | 9-082048 A | 3/1997 |
| JP | 10-050007 A | 2/1998 |
| JP | 2002-170345 A | 6/2002 |
| JP | 2003-173643 A | 6/2003 |
| JP | 2004-95076 A | 3/2004 |

OTHER PUBLICATIONS

Japanese Office Action dated Jul. 6, 2010 and English translation thereof, issued in counterpart Japanese Application No. 2006-185828.

* cited by examiner

*Primary Examiner*—Mark Blouin
(74) *Attorney, Agent, or Firm*—Holtz, Holtz, Goodman & Chick, PC

(57) ABSTRACT

A disc drive apparatus has a base, a disc, and a carriage. The base has a first vibration mode and a second vibration mode as reference vibration modes with respect to frequency response characteristics observed when the disc drive apparatus is shaken. The second vibration mode has a low-frequency second vibration mode (Base 2nd-1), in which a waveform peak is created on the low-frequency side, and a high-frequency second vibration mode (Base 2nd-2), in which a waveform peak is created on the high-frequency side. The two second vibration modes (Base 2nd-1 and Base 2nd-2) have a relationship such that the phase of a pivot position is inverted between them. A frequency of a first bending mode of an arm of the carriage is set in a frequency domain in a trough between the two second vibration modes.

3 Claims, 11 Drawing Sheets

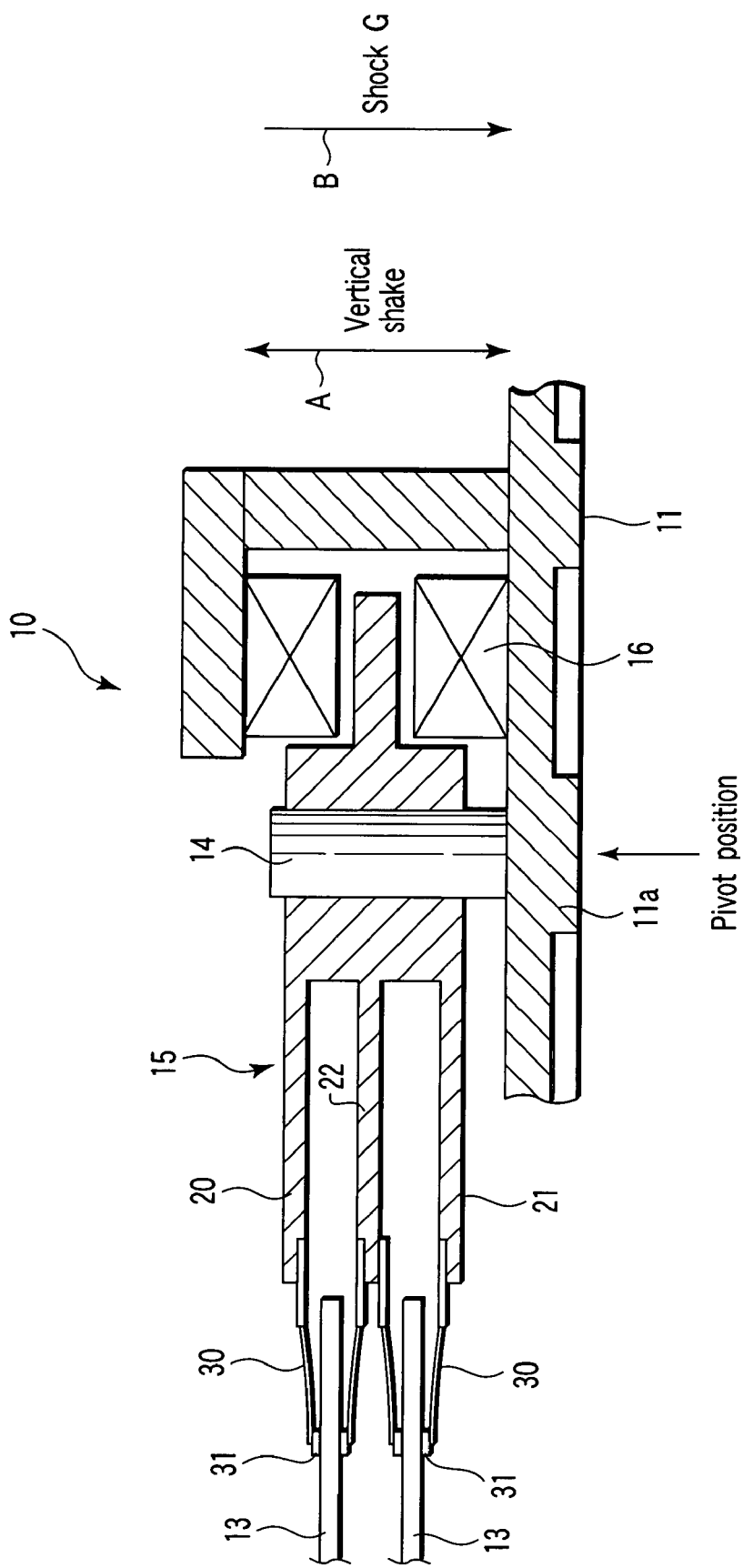
F I G. 2

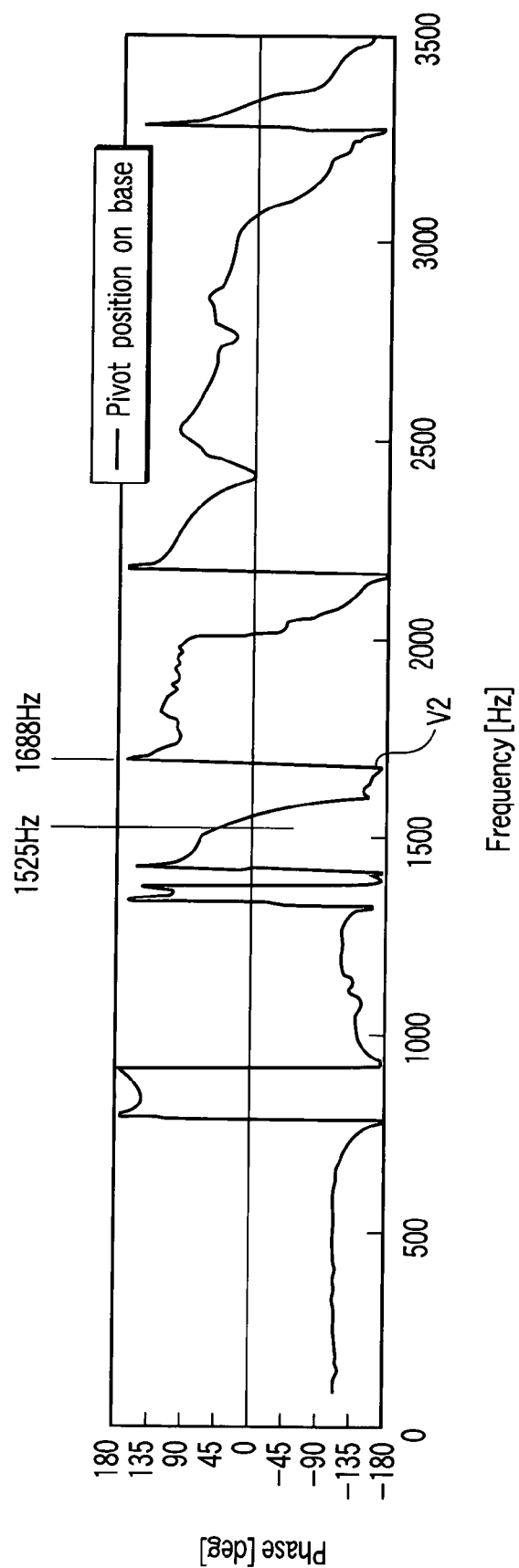
F I G. 6

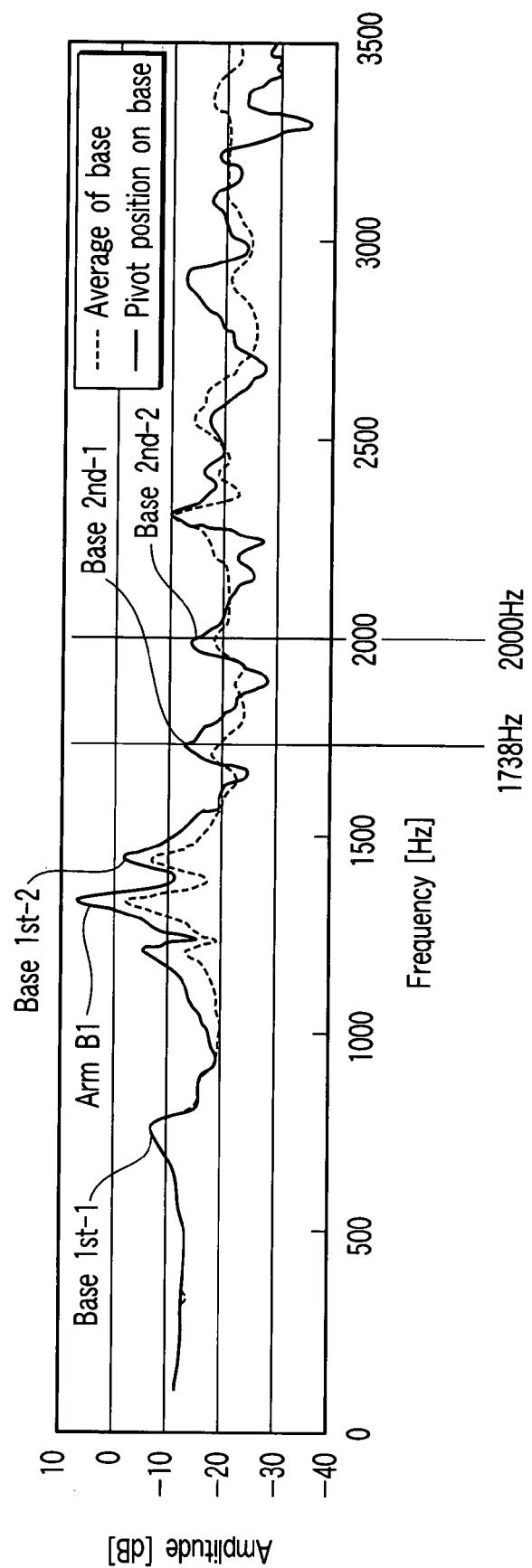
F I G. 9

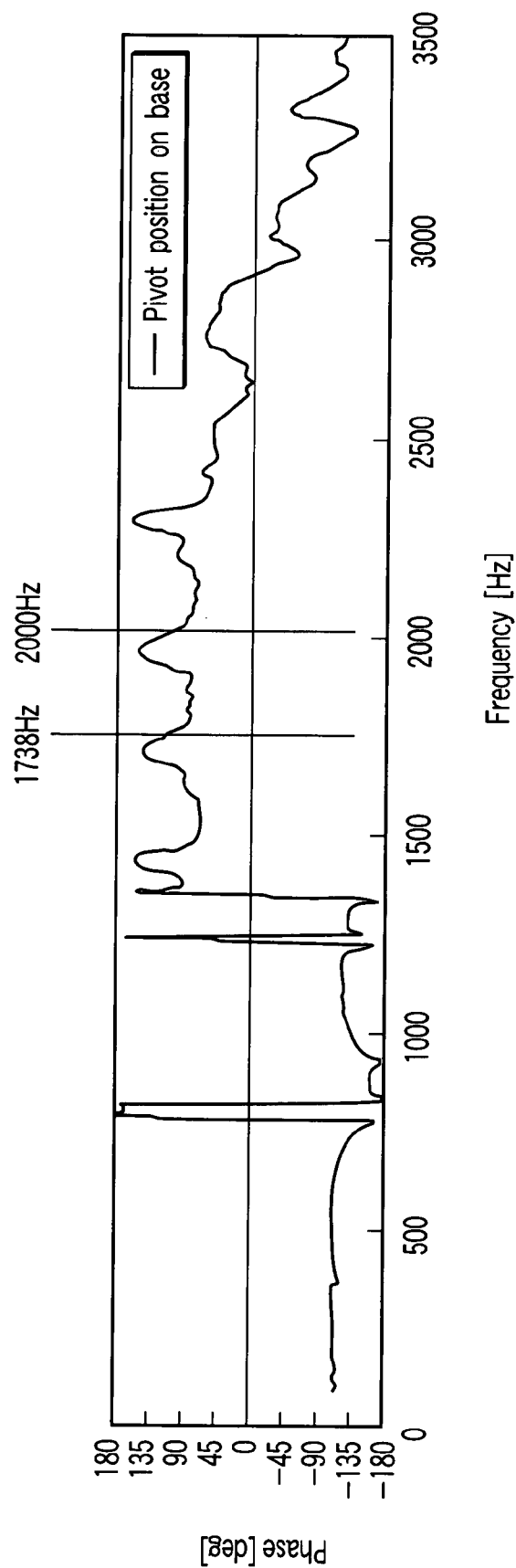
F I G. 10

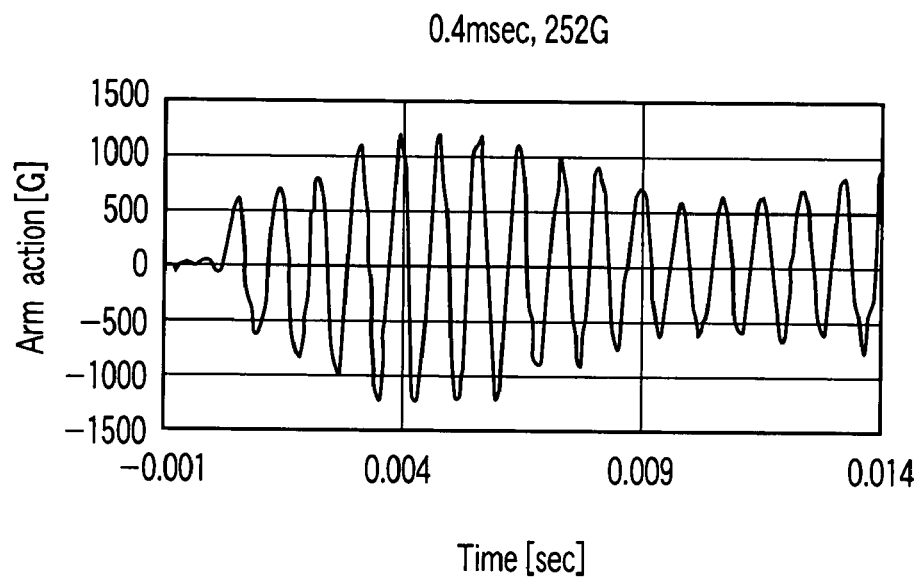
F I G. 11
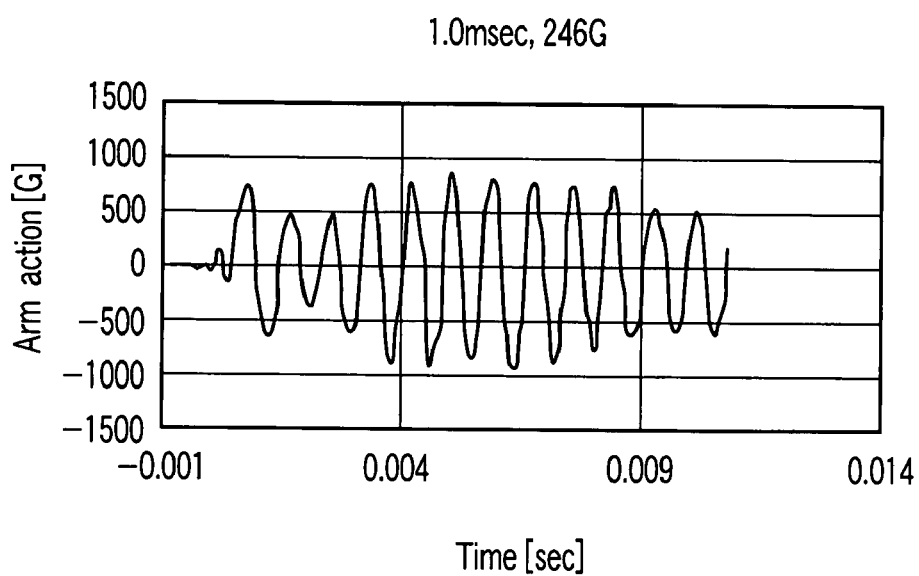
F I G. 12

DISC DRIVE APPARATUS

CROSS-REFERENCE TO RELATED APPLICATIONS

This application is based upon and claims the benefit of priority from prior Japanese Patent Application No. 2006-185828, filed Jul. 5, 2006, the entire contents of which are incorporated herein by reference.

BACKGROUND OF THE INVENTION

1. Field of the Invention

This invention relates to a disc drive apparatus used in an information processing apparatus, such as a personal computer.

2. Description of the Related Art

A hard disc drive apparatus or HDD (hereinafter referred to simply as a disc drive apparatus) is used in an information processing apparatus, such as a personal computer. The disc drive apparatus comprises a magnetic disc (hereinafter referred to simply as a disc) that is rotated by a spindle motor, a carriage that turns about a pivot, a positioning motor for driving the carriage, a box-shaped base, etc. The base contains therein the disc, carriage, positioning motor, etc.

The pivot is attached to the base. The carriage has a plurality of arms. Each arm is provided with a suspension. A magnetic head for writing data to and reading it from the disc is provided on the distal end portion of each suspension.

For example, a 2.5-inch disc drive apparatus has two discs for use as recording media. The carriage includes a top arm, a bottom arm, and a mid-arm. The mid-arm is disposed between the top and bottom arms. A suspension is attached to each of the arms. A slider that constitutes a magnetic head is mounted on the distal end portion of each suspension. One such disc drive apparatus is shown in FIG. 2 of Jpn. Pat. Appln. KOKAI Publication No. 2003-173643 or FIG. 3 of Jpn. Pat. Appln. KOKAI Publication No. 2004-95076, for example.

If a shock is applied to the disc drive apparatus, the arms swing as the base swings. In order to improve the operational shock characteristic performance of the disc drive apparatus, it is desirable to minimize the swings of the arms when the shock is applied. It is effective, in particular, to suppress the swings of the arms to cope with a short-duration shock that is applied for a short time (e.g., 0.4 sec or thereabouts).

FIG. 14 shows the frequency response characteristics of a conventional disc drive apparatus. In FIG. 14, a broken line represents the average of amplitudes of the base as a whole, a solid line represents the amplitude of a pivot position on the base (in which the pivot is mounted), and a dash-dotted line represents the amplitude of the top arm. A first bending mode of the top arm is at 1,263 Hz.

A solid line in FIG. 14 represents the fluctuation of the pivot position. In connection with the fluctuation of the pivot position, a low-frequency first vibration mode (Base 1st-1) is exhibited near 800 Hz. This low-frequency first vibration mode is a vibration mode in which the base is swung based mainly on the mass of the spindle motor (mass including the discs 13). Further, a high-frequency first vibration mode (Base 1st-2) is exhibited near 1,300 Hz. This high-frequency first vibration mode is a vibration mode in which the base is swung based mainly on the total mass of the spindle motor and the carriage.

In short, the pivot position of the conventional disc drive apparatus considerably fluctuates in at least two first vibration modes (Base 1st-1 and Base 1st-2). In particular, the pivot position fluctuates at frequencies near the first bending mode of the top arm. This fluctuation shakes the top arm and produces an amplitude (42 dB) that exceeds a permissible limit. Thus, the shock performance still requires improvement.

BRIEF SUMMARY OF THE INVENTION

The object of this invention is to provide a disc drive apparatus capable of being improved in operational shock characteristic performance.

This invention is a disc drive apparatus comprising a spindle motor, a disc which is rotated by the spindle motor, a base which contains the disc, a pivot located in a pivot position on the base, and a carriage which has an arm and is rotatable about the pivot. In this disc drive apparatus, a frequency of a first bending mode of the arm is set in a frequency domain in a trough in which the amplitude of the pivot position is low with respect to the frequency response characteristics of the base.

According to this arrangement, the arm can be restrained from swinging when a shock is applied to the disc drive apparatus, so that the operational shock characteristic performance of the apparatus can be improved.

In a preferred aspect of the invention, the base has a first vibration mode and a second vibration mode, the second vibration mode having a low-frequency second vibration mode (Base 2nd-1) in which a peak is created on the low-frequency side with respect to the frequency response characteristics and a high-frequency second vibration mode (Base 2nd-2) in which a peak is created on the high-frequency side, and the frequency of the first bending mode of the arm is set in a frequency domain in a trough between the respective peaks of the low- and high-frequency second vibration modes (Base 2nd-1 and Base 2nd-2).

Preferably, moreover, the low- and high-frequency second vibration modes (Base 2nd-1 and Base 2nd-2) of the base are in opposite phases, and the frequency of the first bending mode of the arm is set in a frequency domain in a trough between the two second vibration modes. In this case, the difference between the low- and high-frequency second vibration modes (Base 2nd-1 and Base 2nd-2) should preferably be not greater than 300 Hz.

The term "same phase" described herein refers to a concept that implies complete coincidence in phase, though it involves some phase shift. Further, the term "opposite phases" refers to a concept that implies complete opposition in phase, although it involves some phase shift.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a sectional view typically showing a part of the disc drive apparatus;

FIG. 6 is a diagram showing the relationship between the frequency and phase of the pivot position of the disc drive apparatus having the characteristics shown in FIG. 5;

FIG. 9 is a diagram showing the respective frequency response characteristics of the average of an entire base and a pivot position observed when a disc drive apparatus of a comparative example is shaken;

FIG. 10 is a diagram showing the relationship between the frequency and phase of the pivot position of the disc drive apparatus having the characteristics shown in FIG. 9;

FIG. 11 is a diagram showing a swing of an arm caused when a shock of 0.4 msec is applied to the disc drive apparatus having the characteristics shown in FIG. 9;

FIG. 12 is a diagram showing a swing of the arm caused when a shock of 1.0 msec is applied to the disc drive apparatus having the characteristics shown in FIG. 9;

DETAILED DESCRIPTION OF THE INVENTION

A first embodiment of this invention will now be described with reference to FIGS. 1 to 8.

Figure 1:
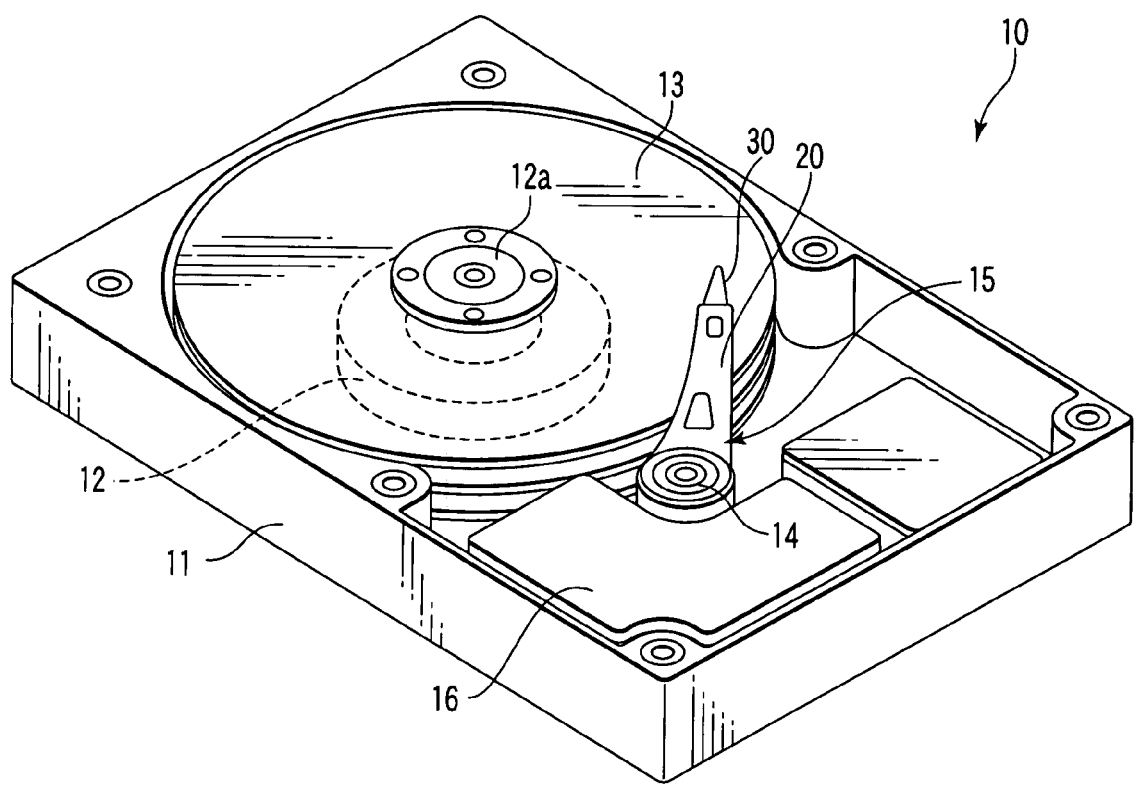
FIG. 1 is a perspective view of a disc drive apparatus according to a first embodiment of the invention.

A disc drive apparatus (HDD) 10 shown in FIGS. 1 and 2 has a box-shaped base 11, a spindle motor 12, two discs 13, a carriage 15, a positioning motor 16, etc. The discs 13 are rotated by the spindle motor 12. A pivot 14 is located beside the discs 13 and extends parallel to a shaft 12a of the motor 12. The carriage 15 turns about the pivot 14. The positioning motor 16 drives the carriage 15.

A cover (not shown) is provided on the top side of the base 11 shown in FIG. 1. FIG. 1 shows a state in which the cover is removed. A dustproof space is defined inside the base 11. The discs 13 that function as recording media are rotated about the shaft 12a by the spindle motor 12. The motor 12 is mounted on the base 11.

The carriage 15 is turned about the pivot 14 by the positioning motor 16. The discs 13, carriage 15, motor 16, etc., are housed in the base 11. The base 11 is in the form of a shallow box. The base 11 has a bottom portion 11a (shown in FIG. 2). In this specification, that position of the bottom portion 11a in which the pivot 14 is located is referred to as a pivot position.

The carriage 15 is provided with a top arm 20, a bottom arm 21, and a mid-arm 22. The top arm 20 is situated on the upper side of FIG. 2, and the bottom arm 21 on the lower side. The mid-arm 22 is located between the arms 20 and 21. In this specification, the top arm 20 sometimes may be referred to simply as "arm".

One suspension 30 is attached to the distal end portion of the top arm 20. Another suspension 30 is attached to the distal end portion of the bottom arm 21. A pair of suspensions 30 are attached to the distal end portion of the mid-arm 22. The paired suspensions 30 are attached individually to one surface and the other surface of the mid-arm 22 so that they are oriented oppositely from each other. A slider 31 that constitutes a magnetic head is mounted on the distal end portion of each suspension 30. When each disc 13 rotates at high speed, an air bearing is formed between the disc 13 and the slider 31, whereupon the slider 31 rises slightly above the disc 13.

Each slider 31 is provided with an element (not shown) that functions as a transducer. This element is used to write data to and read it from the disc 13. As the carriage 15 is turned by the positioning motor 16, the suspensions 30 simultaneously move in the radial direction of the discs 13. Thus, each slider 31 moves to a desired track of its corresponding disc 13.

The paired suspensions 30 are attached to the mid-arm 22 so as to be oriented oppositely from each other. If the mid-arm 22 swings in the axial direction of the pivot 14, therefore, the suspensions 30 restrain each other from swinging. In contrast, the top and bottom arms 20 and 21 are provided with only one suspension 30 each. Thus, the top and bottom arms 20 and 21 are liable to swing with an amplitude higher than that of the mid-arm 22.

Thus, if the swings of the top and bottom arms 20 and 21 can be suppressed, the operational shock characteristic performance of the entire carriage 15 can be improved. The top and bottom arms 20 and 21 have similar tendencies with respect to swings observed when a shock is applied. In this specification, therefore, the operational shock performance will be described mainly for the top arm 20.

Figure 3:
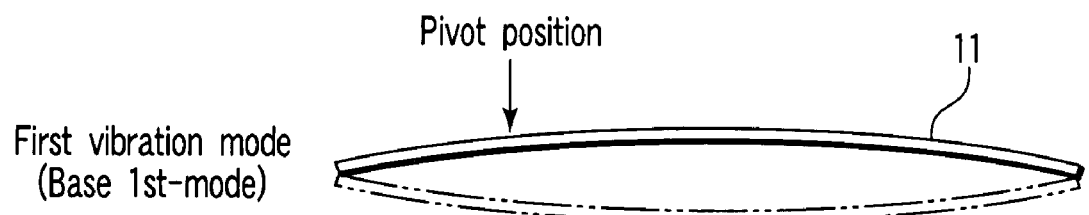
FIG. 3 is a side view typically showing a first vibration mode of a base of the disc drive apparatus.
Figure 4:
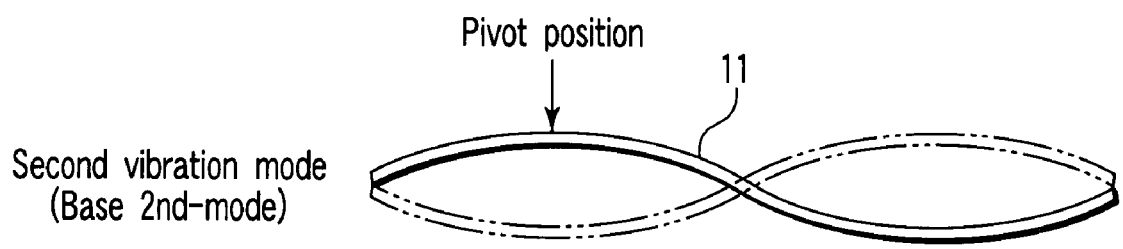
FIG. 4 is a side view typically showing a second vibration mode of the base of the disc drive apparatus.

The base 11 has a first vibration mode (Base 1st-mode) shown in FIG. 3 and a second vibration mode (Base 2nd-mode) shown in FIG. 4 as reference vibration modes. Further, each of the first and second vibration modes has a low-frequency vibration mode in which the base vibrates on the low-frequency side and a high-frequency vibration mode in which the base vibrates on the high-frequency side.

Figure 5:
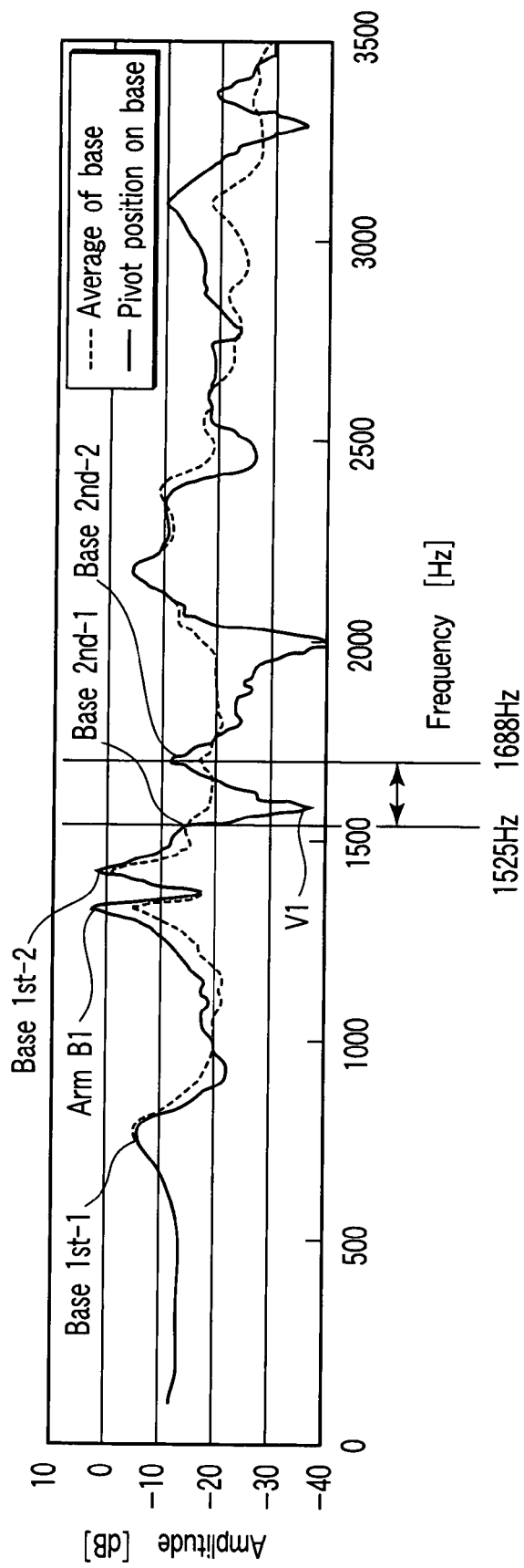
FIG. 5 is a diagram showing the respective frequency response characteristics of the average of the entire base and a pivot position observed when the disc drive apparatus is shaken.

FIG. 5 shows the respective frequency response characteristics of the entire base and the pivot position observed when the disc drive apparatus 10 of the present embodiment is shaken. The direction of the shake is a vertical direction indicated by arrow A in FIG. 2 (axial direction of the pivot 14). Vibrations were measured by means of a laser Doppler vibrometer (LDV).

A broken line in FIG. 5 represents the average of amplitudes of the base as a whole. A solid line in FIG. 5 represents the amplitude of the pivot position on the base. In FIG. 5, the swing of the entire base (represented by a broken line) is to be positively noticed. Thereupon, a low-frequency first vibration mode (Base 1st-1) is exhibited near 775 Hz. This low-frequency first vibration mode is a vibration mode in which the base is swung on the low-frequency side based mainly on the mass of the spindle motor 12 (mass including the discs 13). In contrast, a high-frequency first vibration mode (Base 1st-2) is exhibited near 1,413 Hz. This high-frequency first vibration mode is a vibration mode in which the base is swung on the high-frequency side based mainly on the total mass of the spindle motor 12 and the carriage 15. Further, a low-frequency second vibration mode (Base 2nd-1) is exhibited near 1,525 Hz, while a high-frequency second vibration mode (Base 2nd-2) is exhibited near 1,688 Hz. In FIG. 5, a peak observed near 1,300 Hz is influenced by a first bending mode (Arm B1) of the arms.

Referring now to FIG. 5, the fluctuation of the pivot position (represented by a solid line) will be noted. As seen from FIG. 5, there is a deep trough V1 between the low-frequency second vibration mode (Base 2nd-1) at 1,525 Hz and the high-frequency second vibration mode (Base 2nd-2) at 1,688 Hz. The pivot position is hardly subject to fluctuation in this trough V1. The following is a description of the reason why the deep trough V1 is created.

FIG. 6 shows the relationship between the frequency and phase of the pivot position, that is, the result of examination on the phase change of the pivot position conducted with the frequency changed. As seen from FIG. 6, the phase of the swing in the low-frequency second vibration mode (Base 2nd-1) near 1,525 Hz is considerably deviated from the phase of the swing in the high-frequency second vibration mode (Base 2nd-2) near 1,688 Hz. There exists a point V2 between the two second vibration modes (Base 2nd-1 and Base 2nd-2) at which the phase is inverted. Thus, the two second vibration modes (Base 2nd-1 and Base 2nd-2) are in opposite phases.

In the present embodiment, the shape, stiffness, thickness, gravity center position, etc., of the arms are set so that the first bending mode of the arms lies in the frequency domain of the deep trough V1 (shown in FIG. 5) between the two second vibration modes (Base 2nd-1 and Base 2nd-2) in the opposite phases. An example of the first bending mode of the arms is at 1,550 Hz. Ideally, the first bending mode of the arms should be made to coincide with the deepest position (1,580 Hz in FIG. 5) of the trough V1. In consideration of the specifications, tolerance in manufacture, etc., of the arms, however, it is necessary only that the first bending mode of the arms be set at least in the frequency domain between the two second vibration modes.

As described above, the disc drive apparatus of the present embodiment comprises the base, spindle motor, discs, pivot, and carriage. The base has the first and second vibration modes. Further, the second vibration mode includes the low-frequency second vibration mode (Base 2nd-1) and the high-frequency second vibration mode (Base 2nd-2), in which waveform peaks are created on the low- and high-frequency sides, respectively, in the frequency response characteristics observed when the base is shaken. These two second vibration modes (Base 2nd-1 and Base 2nd-2) are in opposite phases such that the phase of the pivot position is inverted between them. The frequency of the first bending mode of the arms is set in the frequency domain in the trough between the two modes.

If a shock is applied to the disc drive apparatus, it contains various frequency components. In the disc drive apparatus of the present embodiment, the pivot position of the base 11 is urged to fluctuate in opposite phases in the two second vibration modes. Therefore, the fluctuation of the pivot position is suppressed. Thus, the arms are restrained from swinging heavily in the first vibration mode, so that the carriage 15 can fully exhibit its damping effect.

Figure 7:
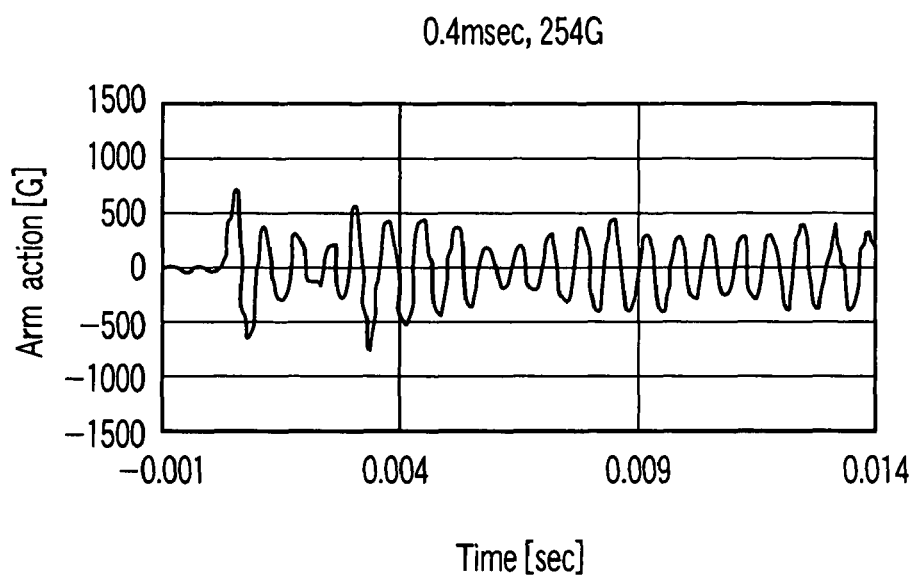
FIG. 7 is a diagram showing a swing of an arm caused when a shock of 0.4 msec is applied to the disc drive apparatus having the characteristics shown in FIG. 5.
Figure 8:
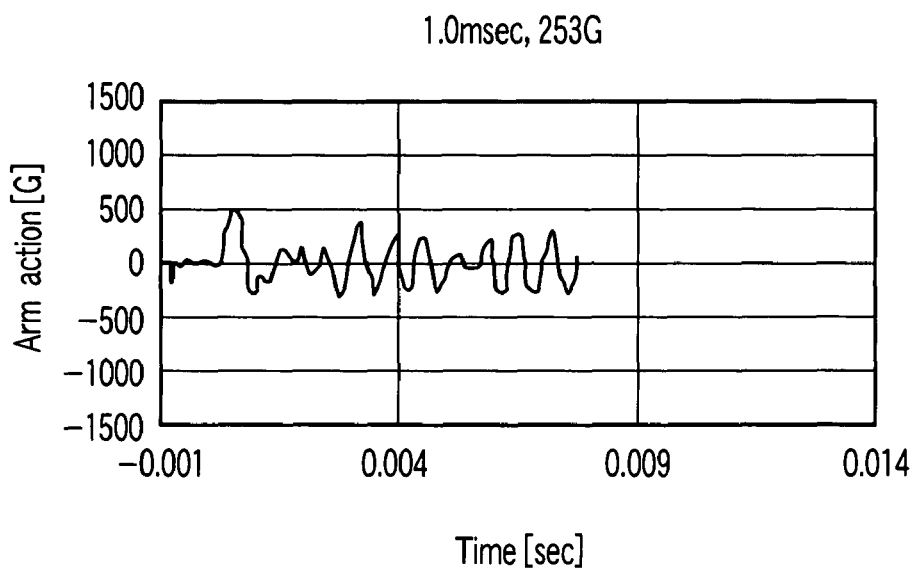
FIG. 8 is a diagram showing a swing of the arm caused when a shock of 1.0 msec is applied to the disc drive apparatus having the characteristics shown in FIG. 5.

FIGS. 7 and 8 show time-based swings of the top arm caused individually when shocks of 0.4 msec and 1.0 msec were applied to the disc drive apparatus (with the characteristics shown in FIG. 5) of the present embodiment. The shocks were applied in the direction indicated by arrow B in FIG. 2 (axial direction of the pivot 14). The measurement was made by using the laser Doppler vibrometer (LDV).

In the disc drive apparatus of the present embodiment, as seen from FIGS. 7 and 8, the amplitude of the top arm is low, and the vibration is attenuated in a short period of time. The same tendency was also observed for the bottom arm and the mid-arm, and satisfactory operational shock characteristic performance was confirmed.

FIG. 9 shows frequency response characteristics observed when a disc drive apparatus of a comparative example is shaken. A broken line in FIG. 9 represents the average of amplitudes of a base as a whole. A solid line in FIG. 9 represents the amplitude of a pivot position on the base. The first bending mode of arms is at 1,263 Hz. As regards the swing of the pivot position of the base, the low-frequency first vibration mode (Base 1st-1) is exhibited near 750 Hz. Further, the high-frequency first vibration mode (Base 1st-2) is exhibited near 1,463 Hz. Furthermore, the low-frequency second vibration mode (Base 2nd-1) is exhibited near 1,738 Hz, and the high-frequency second vibration mode (Base 2nd-2) near 2,000 Hz. A peak observed near 1,300 Hz is influenced by a first bending mode (Arm B1) of the arms.

FIG. 10 shows the result of determination of the relationship between the frequency and phase of the pivot position of the comparative example (FIG. 9). In the case of this comparative example, the low-frequency second vibration mode (Base 2nd-1) near 1,738 Hz and the high-frequency second vibration mode (Base 2nd-2) near 2,000 Hz are in the same phase. Besides, the first bending mode of the arms is at 1,263 Hz. This first bending mode of the arms is greatly deviated on the low-frequency side from the two second vibration modes.

FIG. 11 shows a time-based swing of a top arm caused when a shock of 0.4 msec was applied to the disc drive apparatus (with the characteristics shown in FIG. 9) of the comparative example. FIG. 12 shows a time-based swing of the top arm caused when a shock of 1.0 msec was applied to the disc drive apparatus of the comparative example. As seen from FIGS. 11 and 12, the disc drive apparatus of the comparative example is designed so that its top arm has a high amplitude and its vibration is not liable to attenuation. The bottom arm and mid-arm have similar tendencies, so that their operational shock characteristic performance is poor.

Figure 13:
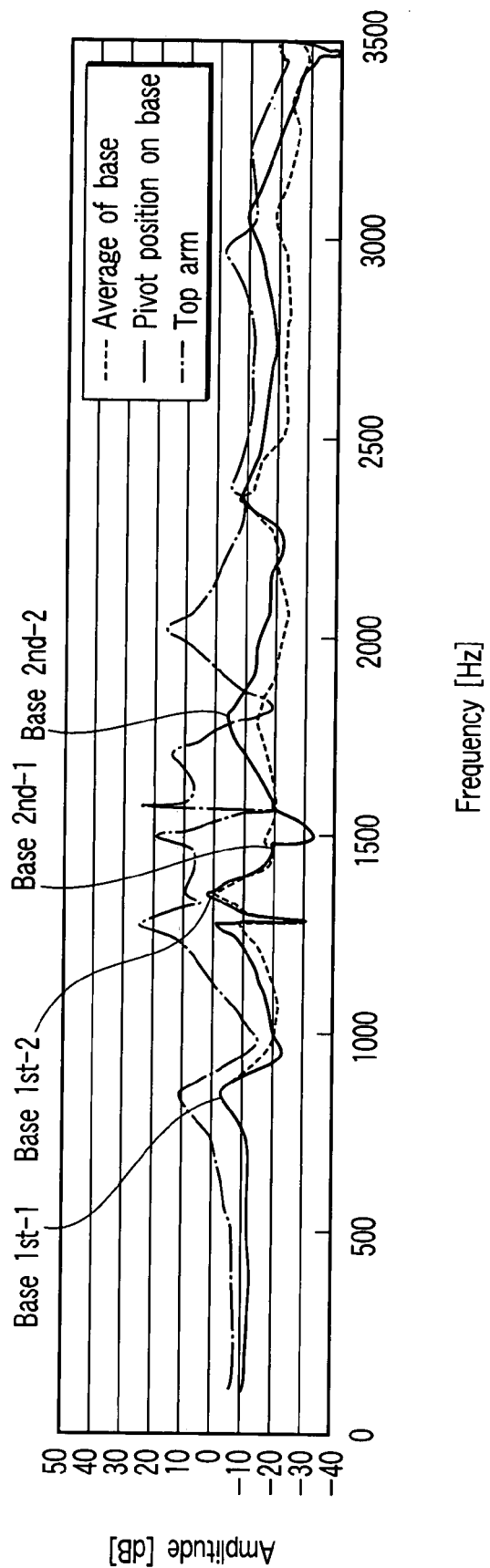
FIG. 13 is a diagram showing the frequency response characteristics of a disc drive apparatus according to a second embodiment of the invention.

FIG. 13 shows the frequency response characteristics of a disc drive apparatus according to a second embodiment of the invention. In FIG. 13, a broken line represents the average of amplitudes of a base as a whole, a solid line represents the amplitude of a pivot position on the base, and a dash-dotted line represents the amplitude of arms.

The base of the disc drive apparatus of this embodiment (FIG. 13) has a low-frequency second vibration mode (Base 2nd-1) near 1,450 Hz and a high-frequency second vibration mode (Base 2nd-2) near 1,750 Hz. These two second vibration modes (Base 2nd-1 and Base 2nd-2) have a difference of 300 Hz and are in opposite phases.

Figure 14:
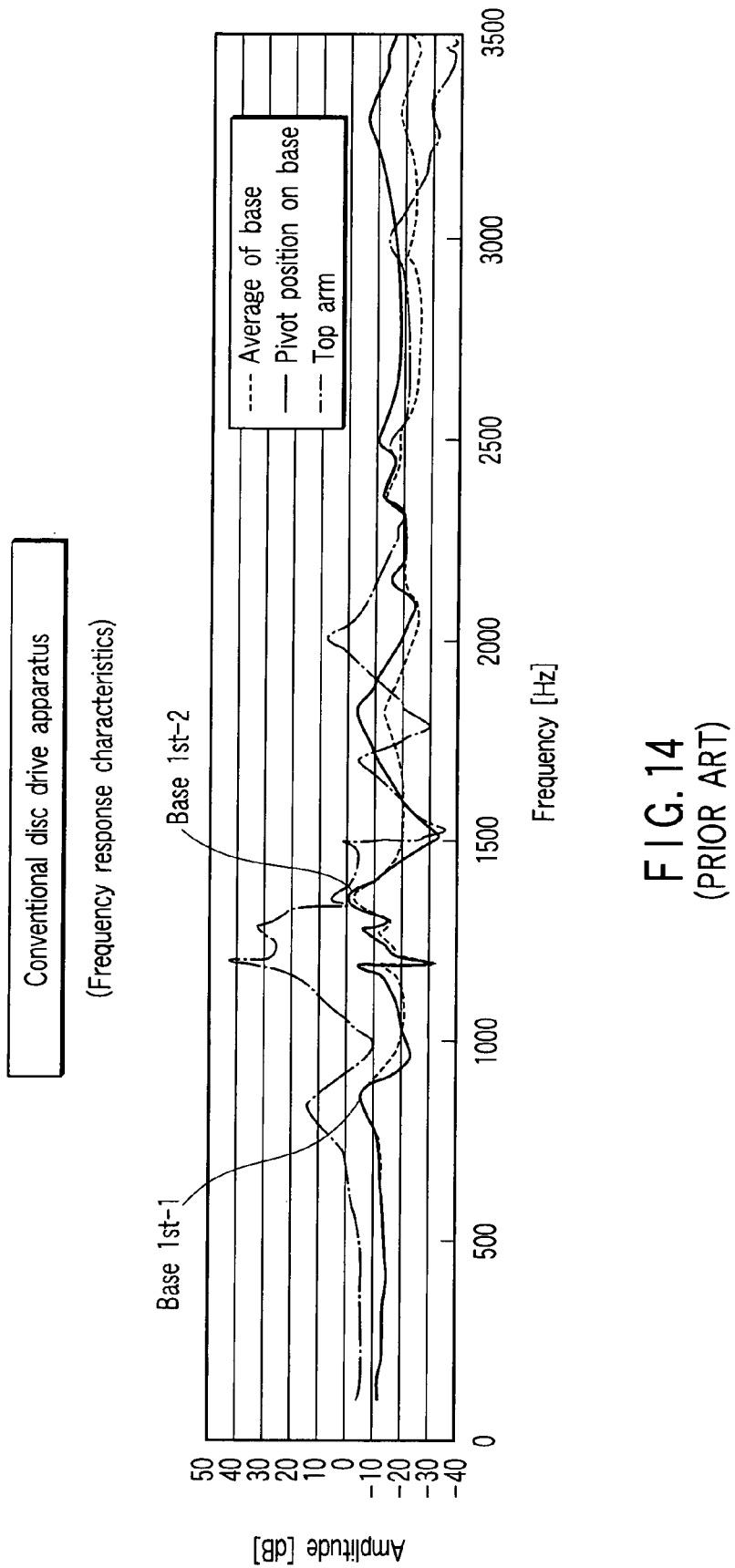
FIG. 14 is a diagram showing the frequency response characteristics of a conventional disc drive apparatus.

In this embodiment, the frequency of the first bending mode of the arms is increased from 1,263 Hz for the conventional case to 1,550 Hz by reducing the mass of the arms. Thus, the first bending mode (1,550 Hz) of the arms is set in a trough between the two second vibration modes. As indicated by the dash-dotted line in FIG. 13, the maximum amplitude of the arms of the present embodiment is 27 dB, which is much lower than the amplitude (42 dB) of the aforementioned conventional disc drive apparatus (FIG. 14).

If the low-frequency second vibration mode (Base 2nd-1) is too much different from the high-frequency second vibration mode (Base 2nd-2), a damper effect is inevitably reduced despite the opposite-phase relationship. The object of the invention can be achieved if the difference between the low- and high-frequency second vibration modes (Base 2nd-1 and Base 2nd-2) is not greater than 300 Hz, as in the case of the foregoing embodiment.

It is to be understood, in carrying out this invention, that the components of the disc drive apparatus, including the base, spindle motor, pivot, carriage, etc., may be variously modified without departing from the scope or spirit of the invention.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A disc drive apparatus comprising:

a spindle motor;

a disc which is rotated by the spindle motor;

a base which contains the disc and includes a pivot position, the base having a first vibration mode, a low-frequency second vibration mode in which a frequency is higher than in the first vibration mode, and a high-frequency second vibration mode in which a frequency is higher than in the low-frequency second vibration mode with respect to frequency response characteristics, wherein the base is configured such that a phase of the pivot position is inverted between the low-frequency second vibration mode and the high-frequency second vibration mode;

a pivot located at the pivot position on the base; and a carriage which has an arm and is rotatable about the pivot, the arm of the carriage being configured to have a first bending mode in a frequency domain between a peak of the low-frequency second vibration mode and a peak of the high-frequency second vibration mode.

2. A disc drive apparatus according to claim 1, wherein the low- and high-frequency second vibration modes of the base are in opposite phases, and the frequency of the first bending mode of the arm is set in a frequency domain in a trough between the two second vibration modes.

3. A disc drive apparatus according to claim 2, wherein the difference between the low- and high-frequency second vibration modes is not greater than 300 Hz.

* * * * *